United States Patent Office 3,216,925
Patented Nov. 9, 1965

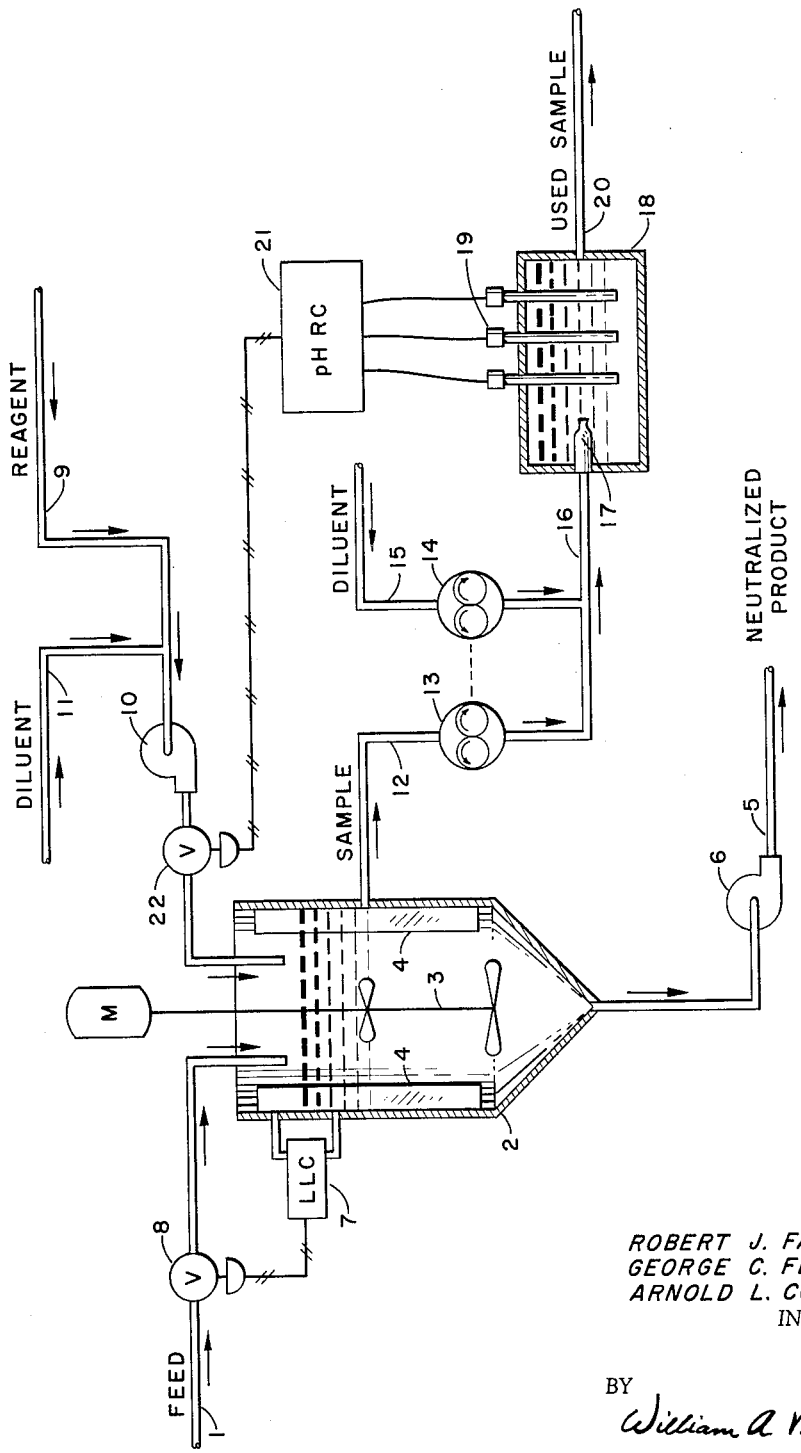

3,216,925
CONTINUOUS NEUTRALIZING OF
AN OILY FLUID
Robert J. Fanning, George C. Feighner, and Arnold L. Coldiron, Ponca City, Okla., assignors to Continental Oil Company, Ponca City, Okla., a corporation of Delaware
Filed Sept. 18, 1963, Ser. No. 309,707
5 Claims. (Cl. 208—273)

This invention relates to continuously controlling pH of a flowing fluid stream of oleaginous consistency. In one aspect, the invention relates to method and apparatus for continuously determining pH of an oily fluid and for adjusting flow of a neutralizing reagent responsive to the determining. In another aspect, the invention relates to method and apparatus for continuously and automatically adjusting pH of an acid oil.

It is common practice in the art of neutralizing to immerse a pH measuring device such as electrodes in the mass being neutralized, and then to feed the resulting signal to a process variable which can effect control of pH, usually the neutralizing reagent flow rate. Such a procedure can be used to effect continuous control of the pH of a flowing stream. However, it has also been known that such a system is entirely unsatisfactory when the fluid being neutralized is of an oily nature. The fluid in such an instance is too good an insulator to allow an accurate flow of current between the electrodes, and furthermore tends to form a static oily film on the electrode surfaces. Thus, in a system of such as a sulfonated natural or synthetic oil, it can be generally stated that pH electrodes will not give a signal which describes the degree of neutralization. It is presently common practice, when neutralizing an acid oil, to operate batchwise in an attended manner. The oil is dumped into a tank and neutralized manually, with the equivalence point being determined by the use of pH paper.

Accordingly, it is an object of this invention to provide method and apparatus for effecting continuous neutralization of an oily fluid. It is another object of this invention to provide method and apparatus for determining pH of an oleaginous fluid by use of conventional pH electrodes, and for continuously adjusting flow of a neutralizing reagent responsive to the determination. It is still another object of this invention to provide method and apparatus for continuously and automatically neutralizing a flowing stream of oily fluid.

Other aspects, objects and the several advantages of the invention will become apparent upon study of this disclosure, the appended claims and the drawing, in which the sole figure comprises a schematic representation of a presently preferred embodiment of this invention.

According to the invention, there are provided method and apparatus for continuously obtaining a predetermined pH in a flowing stream of oily fluid which comprise continuously adding to the flowing stream a reagent capable of altering its pH, continuously withdrawing from the resulting stream a sample portion thereof, continuously admixing with the withdrawn sample portion a solvent therefor in predetermined ratio, measuring the pH of the thus-admixed sample stream, producing a signal proportional to the thus-measured pH responsive to the measuring, and controlling the rate of reagent addition responsive to the thus-produced signal. There are further provided, in such a system, method and apparatus for using a conventional glass electrode for the pH determination by jetting the sample against the measuring electrode.

Referring now to the drawing, the feedstream of low conductivity fluid to be neutralized, for example an acid lubricating oil stock, enters the system by way of conduit 1. The oil is passed to a neutralizing tank 2, which is provided with agitation means such as motor-driven stirrer 3 and vertical baffles 4. Vessel 2 can, if desired, be provided with a closure so as to enable maintaining an inert atmosphere. The neutralized product is withdrawn by way of conduit 5 which contains, if desired, a pump such as at 6. Vessel 2 can further be provided with a liquid level controller 7 which, in cooperation with valve 8, serves to maintain a desired level within the neutralizing vessel 2. A neutralizing reagent, such as aqueous sodium hydroxide, is introduced into neutralizing vessel 2 by way of conduit 9 and pump 10. A diluent, preferably of relatively low viscosity, can also be introduced to the neutralizing vessel 2 by way of conduit 11. The agitation provided by stirrer 3 should be sufficient to effect intimate contact between the feed and the neutralizing reagent, so as to insure rapid neutralization and a representative sample. A sample stream is removed from vessel 2 by way of conduit 12. To this sample stream is added a diluent fluid of low viscosity in predetermined proportion to the sample amount. This can conveniently be effected by means of pumps 13 and 14 and diluent conduit 15. Pumps 13 and 14 can, for example, comprise ganged gear pumps or other positive displacement pumps, or other suitable proportioning means. The thus-diluted sample is passed by way of conduit 16 to pH cell 18. The sample stream is preferably introduced into the pH cell in such a manner as to continuously wash the electrode surfaces thereof. This can conveniently be effected by use of a jet or nozzle as shown at 17. The pH cell comprises a conventional pH measuring cell, preferably a commercially available unit such as a glass electrode cell. Electrodes are shown at 19, and the used sample is removed from the cell by way of conduit 20, from whence it can either be discarded or admixed with the neutralized product in conduit 5. A pH controller or recorder-controller 21 receives a signal from electrode 19, and in known manner produces a signal which is used to operate control valve 22 in conduit 9. Thus, if controller 21 senses a pH in cell 18 below the desired preselected range, it will open valve 22 to compensate accordingly. Of course, in a system wherein there is used an alkaline feed and an acid reagent, detection by controller 21 of a pH below the desired preselected range in cell 18 should operate to partially close valve 22. A drift of measured pH above the desired preselected range should, of course, affect valve 22 in the opposite manner.

Reference is now made to the following specific example, in which a sulfonated oil was neutralized with sodium hydroxide.

A sour oil of 0.3 meq. per gram total acidity was passed at a rate of 0.47 gallon per minute to a neutralization vessel such as shown in the drawing at 2. The neutralizing reagent which was added by way of conduits 9 and 11 comprised about 60 weight percent isopropyl alcohol, 36–37 weight percent water, and 3–4 weight percent sodium hydroxide and was added at an average rate of 0.12 g.p.m. A sample was withdrawn by way of conduit 12 at a rate of 100 ml./min., and to this sample was proportioned 300 ml./min. of a solvent which comprised 80 weight percent isopropyl alcohol and 20 weight percent toluene. Vessel 2 had a 15-gallon capacity and was provided with four one-inch baffles 90 degrees apart as shown at 4. Agitation was provided with a 6-inch diameter turbine impeller near the cone break point and a 4-inch diameter marine impeller at the level of the sample take-off point. The transport delay of this system was approximately ten seconds. The proportional band of controller 21 was set at 50 percent, its reset rate at 0 repetitions per minute, and its rate at 0 minutes. Valve 22 was a linear valve with 0.18 gallon per minute maximum flow. This system consistently produced a neutralized oil of a pH of $7.5 \pm 0.4$ with a natural frequency of 0.12 cycle per minute, and showed good response to severe upset.

Suitable controls for use in this system are as follows:

Reagent control valve—Research Control Type 785, ¼" ATO
pH recorder controller—Leeds and Northrup "Speedmax G"
pH cell—Leeds and Northrup standard electrodes and temperature compensator mounted in epoxy resin cell
Liquid level controller—Foxboro Model 57 with D/P cell type 13 LA In the preceding example, isopropyl alcohol was added in the reagent stream as well as to the sample stream period. The addition of isopropyl alcohol to the reagent stream is a characteristic of this acid oil system, since it aids in subsequent separation of the neutralized oil from the reagent phase-by-phase separation. Using the concentrations set forth in the previous example, the ratio of acid oil to reagent is preferably about 4:1 by volume. In this same system, reagent concentration is preferably chosen such that the ratio of acid oil flow rate to reagent flow rate is preferably between about 4:1 and 6:1 for most effective control. The sampling system is preferably designed with a total transport time of about 10 seconds or less in order to achieve stable control.

According to this invention, the sample stream must be diluted with a solvent of such type and in such amount that the resulting mixed stream is amenable to measurement with conventional pH electrode systems, i.e. the solvent type and ratio to the sample are chosen such that the resulting mixed sample stream has a viscosity below about 10 to 20 centipoises. Measurement of pH by commercial instruments of an oily fluid having a viscosity higher than approximately this figure is generally considered to be unsatisfactory.

In the preceding example, there was used as diluent for the sample stream an 80:20 weight ratio of isopropanol and toluene; this mixture was found to be especially advantageous for the sulfonated oil being treated there. The solvent which is added to the sample stream preferably completely dissolves all principal components thereof; in this instance these components comprise oil, water, caustic, acid oil, and its sulfonate salt, and the isopropanol-toluene mix accomplishes this. Other suitable diluents include normally liquid paraffins such as hexanes and heptanes, cycloparaffins such as methylcyclohexane and methylcyclopentane, aromatics such as benzene, toluene and xylene, lower water-soluble alcohols such as methanol, ethanol, n-propanol and the butanols, and mixtures of these organics. It is preferred that the diluent be liquid at the operating temperature in order to avoid necessity for a pressurized system, although such operation is within the scope of the invention. Principal effects accomplished by diluting the sample stream appear to be reduction of sample viscosity and solubilizing of the oily stagnant film which tends to collect on the electrode surfaces. It is advantageous, according to this invention, to direct the resulting mixed sample stream against the electrode surface in order to continually drive off the oil film which has collected. This makes possible a much faster electrode response, and produces greater accuracy by exposing the electrode to a fresh sample.

Although the preceding example illustrates application of this invention to neutralization of a sulfonated oil, it will be obvious to those skilled in the art that the concept of the invention is equally applicable in neutralizing or adjusting pH in other systems wherein there prevails an oily fluid. For instance, the invention is useful in neutralizing excess acid in the alkylate product resulting from acid-catalyzed hydrocarbon alkylation.

Having thus described the invention by providing specific examples, thereof, it is to be understood that no undue limitations or restrictions are to be drawn by reason thereof and that many variations and modifications are within the scope of the invention.

What is claimed is:
1. A method for continuously obtaining a predetermined pH in a flowing stream of sulfonated oil which comprises:
    (a) continuously adding to said flowing stream an aqueous neutralizing reagent which alters the pH of said flowing stream;
    (b) continuously withdrawing from the combined stream a sample portion thereof;
    (c) continuously admixing with said sample portion solvent therefor in a predetermined ratio, said solvent comprising a mixture of about 4 parts by weight of isopropanol to 1 part toluene;
    (d) passing said admixture to a pH measuring zone and therein measuring the pH of said admixture;
    (e) producing, responsive to said measurement, a signal proportional to the measured pH; and
    (f) controlling the rate of addition of said reagent of step (a) responsive to the signal produced in step (e).
2. The method of claim 1 wherein with the neutralizing reagent of step (a) a stream of water-miscible alcohol also is added continually.
3. The method of claim 2 wherein said water-miscible alcohol is isopropanol.
4. The method of claim 2 wherein the ratio of sulfonated oil to neutralizing reagent and water-miscible alcohol is between about 4 to 1 and 6 to 1 by volume.
5. The method of claim 2 wherein the ratio of sulfonated oil to neutralizing reagent and water-miscible alcohol is about 4 to 1 by volume.

References Cited by the Examiner

UNITED STATES PATENTS

| | | | |
|---|---|---|---|
| 2,607,718 | 8/52 | Suthard | 23—253 |
| 2,721,833 | 10/55 | Defoe et al. | 208—273 |

DELBERT E. GANTZ, *Primary Examiner.*

ALPHONSO D. SULLIVAN, *Examiner.*